United States Patent [19]

Brassat

[11] 3,883,469

[45] May 13, 1975

[54] PROCESS FOR THE PRODUCTION OF POLYAMIDE MOULDINGS

[75] Inventor: Bert Brassat, Krefeld, Germany

[73] Assignee: Bayer Aktiengesellschaft, Leverkusen, Germany

[22] Filed: Apr. 10, 1974

[21] Appl. No.: 459,804

Related U.S. Application Data

[63] Continuation of Ser. No. 317,770, Dec. 22, 1972, abandoned.

[30] Foreign Application Priority Data

Dec. 24, 1971 Germany............................ 2164483

[52] U.S. Cl............................. 260/37 N; 260/78 A
[51] Int. Cl.............................................. C08g 51/04
[58] Field of Search........................ 260/37 N, 78 A

[56] References Cited

UNITED STATES PATENTS

| | | | |
|---|---|---|---|
| 3,372,137 | 3/1968 | Tierney.............................. | 260/37 N |
| 3,386,943 | 6/1968 | Hedrick et al..................... | 260/37 N |
| 3,419,517 | 12/1968 | Hedrick et al..................... | 260/37 N |

*Primary Examiner*—Donald E. Czaja
*Assistant Examiner*—S. M. Person
*Attorney, Agent, or Firm*—Plumley & Tyner

[57] ABSTRACT

An improved process for the activated anionic polymerisation of lactams having at least 5 ring members, the improvement comprising polymerising the lactam in the presence of at least one silicate of sheet structure.

3 Claims, No Drawings

PROCESS FOR THE PRODUCTION OF POLYAMIDE MOULDINGS of application Ser. No. 317,770, filed Dec. 22, 1972 and now abandoned.

The present invention relates to a process for the production of polyamide mouldings with a low extractible monomer content by the activated anionic polymerisation of lactams.

It is known that the activated anionic polymerisation of lactams to form polyamides proceeds more quickly by several powers of ten than the conventional polymerisation by hydrolysis. Thanks to this high reaction speed it is possible to carry out production of the polyamide and its subsequent processing in one operation. It is known for example that blocks or articles from polyamide can be directly obtained from lactam by carrying out polymerisation either in stationary moulds (US Pat. No. 3,317,646; German OS 1,420,833), suitable embossing dies (German OS 1,934,305) or in injection-moulding machines (French Patent 94,666) depending on the size and nature of the end product. In addition, lactams can be processed by activated anionic polymerisation in rotary moulding machines (German OS 1,595,638) to form hollow bodies and in extruders (British Patent 986,678) to form profiles.

All methods mentioned here have the great advantage that the intermediate stage of the crude polyamide, which is generally obtained as granulated material in the course of hydrolytic polymerisation, is obviated. Therefore according to the anionic polymerisation it is possible to save storage and processing costs, but the residual monomer in the polyamide cannot be removed, as this is only economic when the polyamides are in form of granules.

As a result of their residual monomer content, whose amount depends on the polymerisation temperature, the mechanical properties of the polyamide are modified, that is the polyamide is plasticized. Because the monomer separates from the mouldings by diffusion in the course of time and is deposited as a whitish layer on their surface, the mechanical properties of the mouldings undergo an undesired change. In addition, the unsightliness and physiological properties of the lactam coat (all lactams in question have a thoroughly bitter taste and irritate the mucous membranes) render the use of such mouldings impossible in numerous fields of application.

Thus, attempts have often been made to develop methods for carrying out anionic polymerisation of lactam which yield polyamides with a low monomer content. Basically two possibilities are known. One of them consists in carrying out polymerisation at the lowest possible temperature. The position of the equilibrium of the polymerisation reaction is thus shifted in favour of more complete polymerisation. Simultaneously, however, the polymerisation speed is reduced and hence the space/time yield and the efficiency of the process. When carrying out the polymerisation in the extruder or in the injection-moulding machine, the usable temperature range will also be limited by the relatively high softening temperature of the polyamide below which the material cannot be moulded. Two processes have recently become known in which the polymerisation process is carried out in two steps, the second one of them taking place at a temperature below the melting point of the polymer and after the polymer has been subjected to extrusion or injection moulding (British Patent 944,307 and German OS 2,017,512). The usefulness of these processes, however, is limited because during the after-polymerisation the temperature must be kept under precise control which involves considerably technical outlay and the use of additional devices (heating tunnels, furnaces).

The second possibility mentioned is restricted to extrusion polymerisation and consists in liberating the polymer from residual monomers by blowing out with an inert gas or by evaporating in a degasing zone arranged in front of the extruder nozzle (German Offenlegungsschrift 1,495,658, U.S. Pat. No. 3,484,414). To fit an extruder with a degasing zone, however, involves extra cost. Furthermore, the residence time of the material in the degasing zone is limited and the removal of the residual monomers incomplete, unless a special degasing extruder, which is relatively costly, is employed.

It is hence an object of the present invention to improve the activated anionic polymerisation of lactams and moulding in such a way that the extractible monomer content of the resulting polyamide mouldings is lower than in the previous method of performing the process with the above-mentioned disdavantage arising.

It has now been found that this aim can be achieved if the anionic polymerisation of lactams is carried out in the presence of silicates of sheet structure. This reduction was not detectable upon the addition of other silicates or of silica-free minerals.

Therefore the present invention relates to an improved process for the activated anionic polymerisation of lactams having at least 5 ring members, the improvement comprising polymerising the lactam in the presence of at least one silicate of sheet structure.

Minerals of the talc pyrophyllite group, kaolin allophane group, mica group, brittle mica, serpentine minerals and chlorite minerals belong to the silicates having sheet structure. As representatives there may be mentioned, e.g. talc, muscovite, biotite, serpentine, and chrysotile. Mineral mixtures are also suitable which contain the sheet silicates in the desired amounts. The silicates are added to the polymerisable mixture in an amount of about 0.5 – 25 % by weight, preferably 2 – 15 % by weight, based on the lactam content of the mixture.

Suitable lactams for carrying out the above process are: α-pyrrolidone, ε-caprolactam, oenanthic lactam, caprylic lactam or lauric lactam.

The conventional catalysts are added to the polymerisation mixtures e.g. alkali metal and alkaline earth metal compounds of lactams, e.g. sodium -ε-caprolactamate, or of short-chain aliphatic carboxylic acids, e.g. sodium formiate, potassium formiate, or of alcohols with up to 25 carbon atoms, such as sodium methylate, potassium-tert.-butylate or sodium phenolate, sodium stearylate or alkali metal and alkaline earth metal hydrides, hydroxides and carbonates.

As examples of the numerous known activators which are suitable for the rapid anionic polymerisation there may be mentioned phenylisocyanate, toluylene-1,4-diisocyanate, hexamethylene-1,6-diisocyanate, caprolactam-N-carboxylic acid-N'-phenylamide, hexamethylene-1,6-bis(carbamidocaprolactam), triphenoxy-s-triazine and N-stearoyl-caprolactam.

Other usual additives can also be added to the mixture before, during or after polymerisation. These are, for example, regulators, such as butylacetamide, inorganic or organic pigments or dyestuffs such as carbon black, $TiO_2$ or plasticisers or mould-release agents, inorganic or organic fibres such as glass fibres or glass mats or fibrous asbestos, fillers such as glass balls or calcium carbonate, auxiliaries for rendering flameproof such as red phosphorus, organic halogen compounds, phosphoric acid ester or metal oxides, also blowing agents such as azides or hydrocarbons.

Using the process according to the invention the residual monomer content in the finished polyamide mouldings can be reduced by at least 30 % as compared to polyamide mouldings produced without the addition of silicate.

The polymerisation of these mixtures is carried out in the usual way at temperatures of 140° to 300°C. It can be carried out in a discontinuous process, e.g. in stationary moulds, in rotary moulds, in injection-moulding machines, or in screw presses or ram extruders, preferably, however, in a continuous process, e.g. in heated pressure pipes or in extruders, the polymerisable mixture being first melted if desired in a vessel and being conveyed by means of a gear pump into the heated cylinder of the machine to be used.

EXAMPLE 1

A glass flask of 250 ml with a gas inlet pipe and stirrer contains a powder-like mixture of

```
110    g caprolactam
  0.6  g sodium caprolactamate
  1.2  g hexamethylene-1,6-bis-carbamido-caprolactam
  0.6  g N-benzyl-acetamide
  0.3  g aluminium isopropylate
``` as well as the amount given in the Table 1 of the particular ground silicate of the sheet structure ( = sheet silicate). The flask containing the mixture is immersed in an oil bath which is heated to 215°C whilst stirring and passing over nitrogen. The composition first melts and then polymerises. When the mixture can no longer be stirred it is left to cool in air at room temperature, the flask broken, the polymer comminuted and the extract contents determined according to the method given in the Kunststoffhandbuch (Publisher: R. Vieweg), vol. 6 "Polyamide", page 570. The results set forth in Table 1 show the influence of a series of different sheet silicates on the extract contents.

Table 1

| Sheet silicate used. | Extract Contents |
| --- | --- |
| without (for comparison) | 5.5 % |
| 5.5 g talc | 2.6 % |
| 11 g muscovite | 3.2 % |
| 5.5 g chrysotile | 3.1 % |
| 5.5 g muscovite/quartz [+] | 2.2 % |
| 11 g talc/dolomite [+] | 3.1 % |
| 5.5 g bentonite | 2.9 % |
| 5.5 g kaolin | 3.4 % |

[+]commercially available natural mixture

EXAMPLE 2

The test described in Example 1 is repeated. However, instead of the sheet silicates other ground fillers are employed. Table 2 shows that the extract contents cannot be reduced as in Example 1 either by silicate minerals without sheet structure or by silicate free fillers.

| Filler used | Extract contents |
| --- | --- |
| 11 g orthoclase | 5.1 % |
| 5.5 g pumice powder | 5.6 % |
| 5.5 g iron oxide (calcined) | 10.2 % |
| 11 g dolomite | 6.0 % |
| 11 g barium sulphate (precipitated) | 7.0 % |
| 5.5 g calcite | 6.2 % |
| 5.5 g chalk | 7.3 % |
| 11 g cristobalite powder | 5.7 % |
| 11 g quartz powder | 5.0 % |
| 11 g hornblende | 5.2 % |

EXAMPLE 3

A twin-screw extruder with a 43 mm screw diameter and 30 diameter long serves as a polymerisation device. It has 5 zones which are heated independently of each other. The feed zone remains unheated and the other heating zones are heated up to the following temperatures:

180/230/230/230°C

Extrusion is carried out through an extrusion nozzle heated to 250°C. The extruded polyamide is cooled in water and granulated. The polymerisable mixture consists of:

```
Parts by weight
  1100 caprolactam
    10 hexamethylene-1,6-bis-carbamido-caprolactam
     5 sodium caprolactamate
     6 N-benzyl-acetamide
     4 aluminium isopropylate
``` as well as the amount of talc given in the Table 3. Table 3 shows the extract contents of the granulates in relation to the talc content.

Table 3

| Talc content (parts) | Extract contents (%) |
| --- | --- |
| 0 | 6.9 |
| 25 | 5.7 |
| 50 | 4.5 |
| 75 | 3.5 |
| 100 | 2.8 |
| 150 | 2.8 |

EXAMPLE 4

The polymerisation is carried out in an screw injection-moulding machine with a triple zone screw 88 mm in diameter and 1.20 m long. It has 3 heating zones which are heated to 230/230/250°C. A rectangular plate mould is used, which is kept at room temperature. The mouldings measure 70 × 55 × 5 mm. The machine is charged with a polymerisable mixture of the following composition through the feed inlet:

```
Parts by weight
  1100 caprolactam
    10 hexamethylene-1,6-bis-carbamido-caprolactam
     5 sodium-caprolactam
     6 N-benzyl-acetamide
     4 aluminium isopropylate
    50 talc
```

After introduction the mixture polymerises for 90 seconds and is then injected into the mould. After a further 30 seconds the finished moulding can be released from the mould. Its extract contents amount to 5.9 %. Without talc 11.0 % are obtained.

EXAMPLE 5

The test described in Example 3 is repeated using a polymerisable mixture of the following composition:

Parts by weight
1000 lauric lactam
 600 caprolactam
  11 hexamethylene-1,6-bis-carbamido-caprolactam
   6 sodium caprolactamate
   6 N-benzyl acetamide
 150 talc The nozzle temperature is 230°C. A polyamide granulate is obtained whose extract contents amount to 5.9 %. Without talc the extract contents amount to 9.6 %.

I claim:

1. In the process for the production of polyamides with reduced residual monomer content by activated anionic polymerization of lactams having at least 5 ring members, the improvement which comprises polymerizing said lactam in the presence of 0.5 to 25% by weight based on the lactam of at least one silicate selected from the group of silicates having sheet structure.

2. An improved process as claimed in claim 1 wherein a mineral of the talc pyrophyllite group, kaolin allophane group, mica group, a serpentine mineral or a chlorite mineral is used.

3. In the process for the production of polyamides with reduced residual monomer content by activated anionic polymerization of lactams having at least 5 ring members, the improvement which comprises polymerizing said lactam in the presence of 0.5 to 25% by weight based on the lactam of at least one silicate selected from the group of silicates having sheet structure, the reduction in monomer content being at least 30% when compared with the same polymerization process wherein no silicate having sheet structure is employed.

* * * * *